(12) United States Patent
Meyer

(10) Patent No.: US 10,328,835 B1
(45) Date of Patent: Jun. 25, 2019

(54) FINGER WELL INSERTABLE CUP HOLDER

(71) Applicant: Karen Meyer, Hollywood, FL (US)

(72) Inventor: Karen Meyer, Hollywood, FL (US)

(*) Notice: Subject to any disclaimer, the term of this patent is extended or adjusted under 35 U.S.C. 154(b) by 0 days.

(21) Appl. No.: 16/100,057

(22) Filed: Aug. 9, 2018

Related U.S. Application Data

(60) Provisional application No. 62/547,272, filed on Aug. 18, 2017.

(51) Int. Cl.
| | | |
|---|---|---|
| *B60R 7/00* | (2006.01) | |
| *B60R 11/00* | (2006.01) | |
| *B60N 3/10* | (2006.01) | |
| *B60R 7/04* | (2006.01) | |

(52) U.S. Cl.
CPC ............. *B60N 3/103* (2013.01); *B60N 3/107* (2013.01); *B60R 7/046* (2013.01); *B60R 2011/0021* (2013.01); *B60R 2011/0064* (2013.01); *Y10S 224/926* (2013.01)

(58) Field of Classification Search
CPC .............. B60N 3/103; Y10S 224/926; B60R 2011/0021; B60R 2011/0059; B60R 7/046
USPC ............ 224/926, 556; 248/311.2; 297/188.4; 220/737
See application file for complete search history.

(56) References Cited

U.S. PATENT DOCUMENTS

| | | | |
|---|---|---|---|
| 3,707,272 A | | 12/1972 | Rasmussen |
| 4,606,523 A | | 8/1986 | Statz et al. |
| 4,678,154 A | | 7/1987 | McFarland |
| 4,765,581 A | | 8/1988 | Wallace et al. |
| 4,854,468 A | * | 8/1989 | Dahlquist, II ......... B60N 3/103 220/737 |
| 5,029,793 A | | 7/1991 | Warner |
| 5,044,577 A | * | 9/1991 | Spearman .............. B60N 3/103 224/544 |
| 5,088,673 A | * | 2/1992 | Chandler ............... B60N 3/103 215/386 |
| 5,167,392 A | | 12/1992 | Henricksen |
| 5,474,272 A | | 12/1995 | Thompson et al. |
| 5,490,653 A | * | 2/1996 | Ingwersen ............. B60N 3/102 248/311.2 |
| 5,676,340 A | * | 10/1997 | Ruhnau .................. B60N 3/103 224/926 |
| 5,702,041 A | * | 12/1997 | Sun ........................ B60N 3/101 224/539 |
| 5,743,504 A | * | 4/1998 | Miller .................... B60N 3/103 224/42.38 |

(Continued)

*Primary Examiner* — Justin M Larson
(74) *Attorney, Agent, or Firm* — Knobbe, Martens, Olson & Bear, LLP

(57) ABSTRACT

Devices for holding beverage containers that can be used inside a vehicle or attached to a structure. In one example, a cup holder device for use in a vehicle may include an upper portion having a bottom surface, a peripheral rim offset from the bottom surface, and a side surface connecting the peripheral rim to the bottom surface. The peripheral rim defines an opening that is configured to receive a cup in the upper portion. A lower portion is coupled to the upper portion. The lower portion is configured to fit into a gap of an interior vehicle door, the impression typically formed by at least a first inside wall, a second inside wall, and an inside bottom surface. The lower portion may include a molded form configured to fit inside the impression of an interior vehicle door, or a spring-biased connector to attach to the impression.

15 Claims, 11 Drawing Sheets

(56) References Cited

U.S. PATENT DOCUMENTS

| | | |
|---|---|---|
| 5,897,089 A | 4/1999 | Lancaster et al. |
| 6,059,243 A | 5/2000 | Hikage et al. |
| 6,290,063 B1* | 9/2001 | Vogt .................. B60N 3/103 206/549 |
| 6,315,153 B1* | 11/2001 | Osborn .............. A47G 23/0216 220/737 |
| 6,361,009 B1* | 3/2002 | Li ...................... B60N 3/103 248/311.2 |
| 6,533,233 B2* | 3/2003 | Thomas ............. B60N 3/103 206/217 |
| 6,641,102 B2* | 11/2003 | Veltri ................. B60N 3/103 220/737 |
| 6,827,318 B1* | 12/2004 | Hsu Li ............... B60R 11/00 224/558 |
| 7,243,991 B2* | 7/2007 | Ojeda ................. B60N 3/002 297/188.14 |
| 7,384,182 B2 | 6/2008 | Bhavnani |
| 7,464,988 B2* | 12/2008 | Hassett .............. B60N 3/103 297/188.06 |
| 7,500,443 B1* | 3/2009 | Allen .................. B63B 29/06 114/343 |
| 7,516,931 B2* | 4/2009 | Sarullo ............... A45F 3/20 248/156 |
| 7,568,749 B2 | 8/2009 | Biggs et al. |
| 7,871,050 B2 | 1/2011 | Epstein |
| 7,954,773 B2 | 6/2011 | Carnevali |
| 8,015,943 B1* | 9/2011 | Samuelson ......... A01K 7/00 119/51.5 |
| 8,172,311 B2 | 5/2012 | Hughes, Jr. et al. |
| 8,439,438 B2 | 5/2013 | Oldani et al. |
| 8,459,481 B2 | 6/2013 | Arkin |
| 8,602,373 B2* | 12/2013 | Beckey .............. A47G 23/0225 248/309.1 |
| 8,827,108 B2 | 9/2014 | Tsunoda |
| 8,857,881 B2 | 10/2014 | Shimozaki |
| 9,220,349 B1* | 12/2015 | Cashin ............... F16B 2/04 |
| 9,296,324 B2 | 3/2016 | Mango |
| D757,438 S * | 5/2016 | Eskandry ........... D3/313 |
| 9,452,716 B2 | 9/2016 | Williams et al. |
| 9,889,800 B1* | 2/2018 | Fan .................... B60R 11/0241 |
| D819,408 S * | 6/2018 | Floco ................. D7/553.6 |
| 2002/0023992 A1* | 2/2002 | Veltri ................. B60N 3/103 248/311.2 |
| 2002/0043603 A1* | 4/2002 | Thomas ............. B60N 3/103 248/311.2 |
| 2005/0133557 A1 | 6/2005 | McKenzie et al. |
| 2005/0218170 A1 | 10/2005 | Allmond |
| 2007/0138365 A1* | 6/2007 | Sarullo ............... A45F 3/20 248/311.2 |
| 2012/0049030 A1* | 3/2012 | Tussy ................. A47G 23/0216 248/311.2 |
| 2013/0026336 A1* | 1/2013 | Beckey .............. A47G 23/0216 248/692 |
| 2013/0200094 A1 | 8/2013 | Metcalfe et al. |
| 2013/0205563 A1 | 8/2013 | Zenhausern et al. |
| 2014/0034697 A1 | 2/2014 | Mak et al. |
| 2014/0250918 A1 | 9/2014 | Lofy |
| 2014/0252811 A1 | 9/2014 | Whalen |
| 2016/0031379 A1 | 2/2016 | Duncan |
| 2016/0257255 A1 | 9/2016 | Gaudig et al. |
| 2016/0297341 A1 | 10/2016 | Wallace et al. |

* cited by examiner

FINGER WELL INSERTABLE CUP HOLDER

CROSS-REFERENCE TO RELATED APPLICATION(S)

This application claims a priority benefit under 35 U.S.C. § 119(e) from provisional Application No. 62/547,272, filed Aug. 18, 2017, the contents of which are hereby expressly incorporated by reference in their entirety. Furthermore, any and all priority claims identified in the Application Data Sheet, or any correction thereto, are hereby incorporated by reference under 37 C.F.R. § 1.57.

FIELD OF INVENTION

This disclosure relates to a device for holding a cup, for example, in a vehicle.

BACKGROUND

Often times there are a need for a cup holder for a beverage container, for example, can, bottle, or cup. A cup holder holds a drink in place in a stabilized fashion. Holding a drink in a stabilized fashion permits a person to place the drink in the cup holder without having to worry about the drink spilling. This situation frees up the person's hands and allows her to attend to other matters. When the person would like the drink back, she can simply reach over to the cup holder and easily remove the drink.

Cup holders are especially important when a person is in a vehicle. For example, a driver of a car needs a place to set a drink down securely, so she can focus on driving. Additionally, the passengers in a car need a place to set their drinks so they do not have to hold their drinks for the entire trip. While vehicle manufacturers have attempted to address these issues by building cup holders into the vehicle, often times these cup holders are not adequate enough to address all of an user's needs. Sometimes, a cup holder is inconveniently placed for the user. This scenario requires a user to ask for help to grab her drink when she needs it or to uncomfortably reach across her seat to grab the drink. Other times, there are not enough cup holders present in the vehicle for every passenger to have a place to set down their drink. This scenario requires a user to hold her drink throughout the entire trip, or set the drink down in an unstable location inside the vehicle. Accordingly, it would be advantageous to have one or more cup holders in convenient locations in a vehicle.

SUMMARY

The embodiments described herein relate to structures and devices for holding a cup or other beverage container. The present invention addresses the problem of holding a beverage container at a desired place in a vehicle that has not been configured with to hold such a container. For example, the cup holder allows a user to place additional cup holders in creative and unique locations in a vehicle. Adding additional cup holders can ensure every user has a cup holder for their drink. Furthermore, these creative and unique locations allow the user to conveniently place and reach her drink.

In some embodiments, the cup holder comprises an upper and lower portion. The upper portion can receive a beverage container. The lower portion is coupled to the upper portion. The lower portion can fit into a defined space (or cavity) of an interior side of a vehicle door, such as a finger well of the door car (e.g., a portion of the door used to pull the door shut). The finger well, or such a cavity or defined space (e.g., on a door, or another portion of the interior of a vehicle) is referred to herein as a "negative impression" or simply as an "impression." In some configurations, the impression may have full or partial one or more side walls, and may have a full or partial lower surface on the interior of the impression. The fit of the cup holder with the impression stabilizes the entire cup holder. In some embodiments, the lower portion of the cup holder comprises a molded form. In some embodiments, the lower portion comprises a pressure pad having one or more surfaces that engages with an interior surface of the impression of an interior vehicle door.

One innovation includes a cup holder device for use in a vehicle, the cup holder device including an upper portion having a bottom surface, a peripheral rim offset from the bottom surface, and a side surface connecting the peripheral rim to the bottom surface, the peripheral rim defining an opening that is configured to receive a cup in the upper portion, and a lower portion coupled to the upper portion, the lower portion configured to fit into an impression of an interior vehicle door or other structure formed by at least a first inside wall, a second inside wall, and an inside bottom surface, the lower portion comprising a molded form configured to fit inside the impression of an interior vehicle door. In some embodiments, the upper portion has a cylindrical shape, or a conical frustum shape. The side surface of the upper portion may be sloped or angled, e.g., with respect to a longitudinal axis of the device. The bottom surface of the upper portion may be flat, or substantially flat. In some embodiments, the bottom surface of the upper portion is solid. In some embodiments, the bottom surface of the upper portion may be lined with padding or another type of soft material to cushion an item placed in the upper portion. In some embodiments of the cup holder, the peripheral rim of the upper portion has a circular shape. In some embodiments, the impression of an interior vehicle door is a pull cup, e.g., a portion of the interior door that includes an impression (e.g., a recessed portion or depression), that is typically used to pull the door shut. In some embodiments, the lower portion maybe formed to fit inside the impression of both a left-sided and right-sided vehicle door. In some embodiments of the cup holder device, the lower portion stabilizes the cup holder device against the surfaces of the impressions the cup holder device is when the inserted into the impression of vehicle door. In some embodiments, the lower portion may have a rectangular shape with rounded edges. In some embodiments, the upper and lower portions are formed from the same material. In some embodiments, the upper and lower portions are coupled by a support wall. In some embodiments, an interior surface of the support wall attaches to the upper portion and a bottom surface of the support wall attaches to the lower portion. In further embodiments, the support wall may be formed from the same material as the upper and lower portions of the device.

Another innovation includes a cup holder device for use in a vehicle, the cup holder device including an upper portion being upwardly open and comprising a hollow generally tubular shape, the upper portion including a bottom surface, a peripheral rim offset from the bottom surface, and a side surface connecting the peripheral rim to the bottom surface, and a lower portion connected to the upper portion. The lower portion including a plate attaching underneath the bottom surface of the upper portion, a connector attaching about perpendicular to the plate wherein the connector is offset from the midline of the upper portion, and a first pressure pad attached to the connector. The first pressure pad may be configured to fit into an impression of an interior vehicle door formed by at least a first inside wall, a second inside wall, and an inside bottom surface, wherein the first pressure pad may be biased to engage with the impression of an interior vehicle door. In some embodiments, the upper portion comprises a cylindrical shape or a conical frustum shape. In some embodiments, the side surface of the upper portion may be sloped or angled, e.g., with respect to a longitudinal axis of the device. The bottom surface of the upper portion may be flat, or substantially flat. In some embodiments, the bottom surface of the upper portion is solid. In some embodiments, the bottom surface of the upper portion may be lined with padding or another type of soft material to cushion an item placed in the upper portion. In some embodiments, the pressure pad comprises a compression spring. In some embodiments the lower portion further includes a second pressure pad attached to the connector, wherein the second pressure pad is configured to fit into the impression of an interior vehicle door, wherein the second pressure pad is biased to engage with the impression of an interior vehicle door. In some embodiments, the lower portion further comprises a third pressure pad attached to the connector, wherein the third pressure pad is structured to fit into the impression of an interior vehicle door, wherein the third pressure pad is biased to engage with the impression of an interior vehicle door. In some embodiments the lower portion further comprises a fourth pressure pad attached to the connector, wherein the forth pressure pad is structured to fit into the impression of an interior vehicle door, wherein the forth pressure pad is biased to engage with the impression of an interior vehicle door.

DETAILED DESCRIPTION OF CERTAIN INVENTIVE ASPECTS

The present invention relates to a cup holder that can be used in an impression of a vehicle. In some embodiments, the cup holder comprises an upper and lower portion. The upper portion can receive a beverage container. The lower portion is coupled to the upper portion. The lower portion can fit into an impression of an interior vehicle door, which stabilizes the entire cup holder. In some embodiments, the lower portion comprises a molded form. In some embodiments, the lower portion comprises a pressure pad that engages with an impression of an interior vehicle door.

Figure 1:
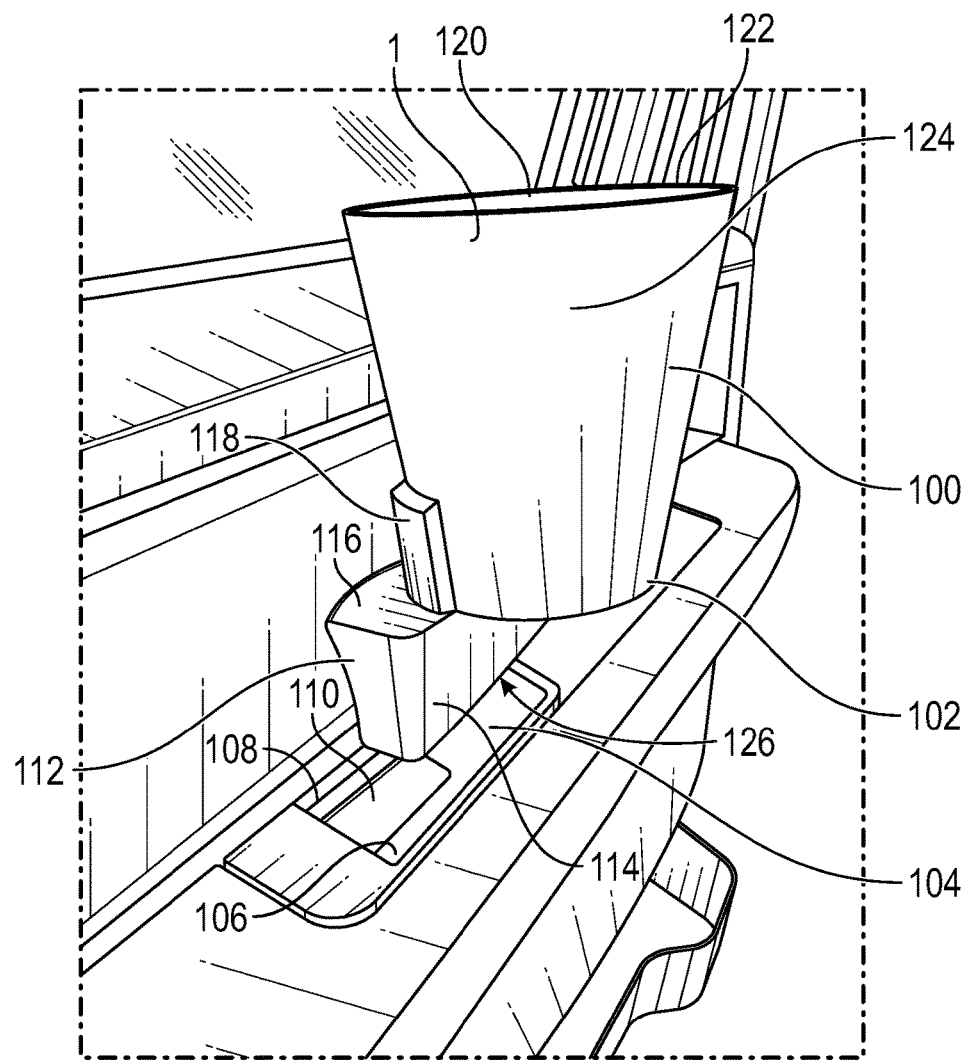
FIG. 1 shows an exemplary view of a cup holder positioned relative to an impression of an interior vehicle door.
Figure 2:
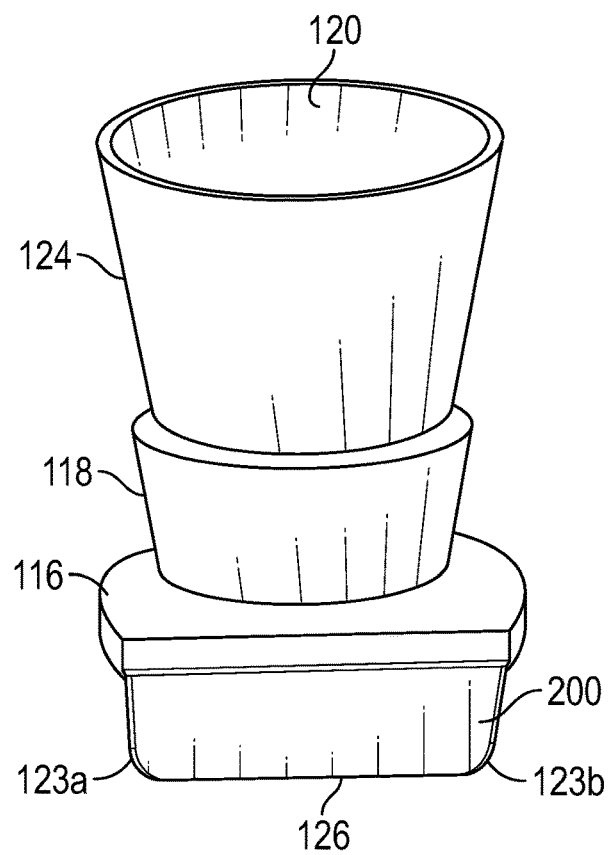
FIG. 2 shows an exemplary rear view of a cup holder with a rounded rectangular lower portion.
Figure 3:
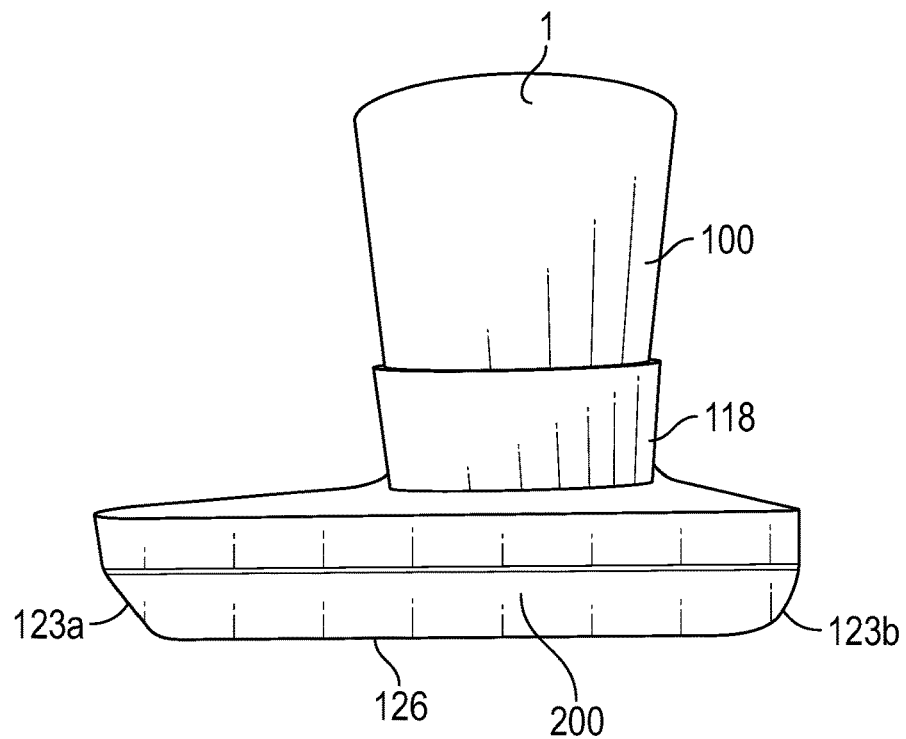
FIG. 3 shows an exemplary rear view of a cup holder with a rounded triangular lower portion.

LISTING OF ENUMERATED FEATURES 1 cup holder
80 door handle
100 upper portion
102 bottom surface of upper portion
104 impression
106 distal side of impression
108 proximate side of impression
110 inside bottom surface of impression
112 lower portion
114 surface of lower portion distal to door when disposed in impression
116 top surface of lower portion
118 upper portion support wall
120 opening of the cup holder
122 peripheral rim
123a front end of lower portion when cup holder is disposed in door
123b rear end of lower portion when cup holder is disposed in door
124 side surface of upper portion
126 bottom surface of lower portion
180 depression in lower portion to receive fingers for pulling door
200 side surface of lower portion disposed proximate to door
400 lower portion
402 fastener
404 connector
406 pressure pad
408 plate 408
410 upper portion FIGS. 1-19 illustrate some of the different features and embodiments of the upper portion. FIG. 1 shows an exemplary cup holder being placed into an impression of an interior vehicle door. In various embodiments, the cup holder can include an upper portion 100 and a lower portion 112. The upper portion 100 comprises a bottom surface 102, a peripheral rim 122, and a side surface 124. The bottom surface 102 defines the bottom of the upper portion 100. The side surface 124 extends out of the bottom surface 102 and connects with the peripheral rim 122. The peripheral rim 122 is offset from the bottom surface 102. The peripheral rim 122 defines an opening 120 in the upper portion 100. A beverage container can be placed inside the opening 120. In some embodiments, a compressible padding or other structures are disposed on the inside of the upper portion 100, allowing for a range of different sized beverage containers to be securely placed into the opening 120 and held by the cup holder. In some embodiments, the compressible padding, or other structures, allows a user to securely place a beverage container with a width smaller than the peripheral rim 122 into the opening 120. In some embodiments, the compressible padding, or other structures, allows for a user to insert or remove a beverage container with little difficulty. In some embodiments, the compressible padding, or other structures, allows for a user to adjust the height of the beverage container in the cup holder.

The upper portion can comprise many different shapes. For example, as illustrated in the example embodiment of FIG. 1, the upper portion 100 comprises a conical frustum shape, as the side wall 124 is sloped outwards between the bottom surface 102 and peripheral rim 122. In some embodiments, the upper portion 100 has a cylindrical shape.

FIGS. 1-19 illustrate some of the different features and embodiments of the lower portion 112. In FIG. 1, the lower portion 112 comprises a molded form 114 and an upper portion support wall 118. The molded form 114 may extend across a base of the cup holder and may be a solid, single piece. The molded form 114 can be molded by a manufacturer to fit certain size sized impressions, or, in some embodiments, may be molded by the user. The molded form 114 can be placed into an impression 104 of an interior vehicle door, or another suitable impression inside a vehicle. Connected to a top surface of the molded form 116 is the upper portion support wall 118. The upper portion support wall 118 is also connected to the upper portion 100. The upper portion support wall 118 increases stability in the upper portion 100. The top surface of the molded form 116 is coupled to the upper portion 100. Coupling the top surface of the molded form 116 to the upper portion 100 also increases stability in the upper portion 100.

Figure 4:
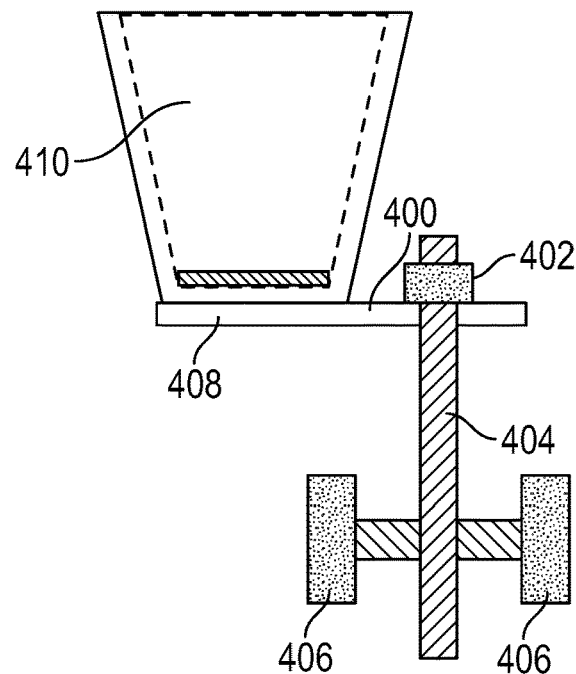
FIG. 4 shows an exemplary view of a cup holder with pressure pads.

In some embodiments, the lower portion can comprise alternative components. For example, FIG. 4 illustrates some of the different features and embodiments of an example embodiment of a lower portion comprising pressure pads which attach the lower portion of the cup holder to a structure. In the example illustrated in FIG. 4, the lower portion 400 comprises a fastener 402, a connector 404, two pressure pads 406, and a plate 408. The plate 408 is connected to a bottom of the upper portion 410. The fastener 402 connects the connector 404 to the plate 408, with the connector 404 at about a perpendicular position in relation to the plate 408. The connector 404 is offset from a midline that defines the middle of the cup holder and runs from the top of the cup holder to the bottom. The pressure pads 406 are connected to the connector 404 and are about parallel to the plate 408. The pressure pads 406 are biased to extend outwards. In some embodiments, the pressure pads 406 comprise springs which are spring loaded and biased to extend outwards. In some embodiments, the user can manually release the pressure pads 406. In some embodiments, the lower portion 400 further comprises a pressure dial that can control how much outward force the pressure pads 406 release.

In various embodiments, the lower portion can have many different shapes. For example, in FIG. 2, the lower portion 200 includes the shape of a rounded rectangle. The bottom surface of the lower portion 126 and side edges front end 123a and rear end 123b of the lower portion are slightly curved, which gives the lower portion 200 a rounded rectangle shape. Another example of how the lower portion can include different shapes can be exemplified by FIG. 3. In the example illustrated in FIG. 3, the lower portion 300 includes a rounded triangular shape. The bottom surface of the lower portion 126 and front end 123a and rear end 123b of the lower portion are slightly curved, which gives the lower portion 300 a rounded triangular shape. In some embodiments, the lower portion's shape is created by the user. For example, the lower portion can comprise a moldable material that permits its user to form the lower portion to any impression she desires. The user can form the shape she desires and cure the moldable material to hold the shape permanently. The moldable material can be cured by a number of different methods, including, but not limited to, heating the moldable material or waiting for the moldable material to harden over time. In some embodiments, the lower portion can comprise the shape of a car pull cup, or finger well. In some embodiments, the lower portion can fit into both a left-sided and right-sided car door's impression.

The lower portion can be modified in different ways to accommodate the structure it will attach to so that the functionality of the impression can still be used (at least partially) when the cup holder is attached. For example, in some embodiments, the molded form can comprise drill holes that allow a user to put her fingers through the hole. In some embodiments, the molded form can have channels carved in the middle of the molded form, which would allow a user to access the impression that the cup holder is occupying.

In some embodiments, the cup holder engages an impression through the lower portion fitting inside the impression. For example, as illustrated in the example embodiment of FIG. 1, the lower portion 112 can be designed to fit into the impression 104. The molded form 114 comprises dimensions that about match the impression's 104 dimensions. The molded form 114 can form a tight friction fit between the first inside wall 106, second inside wall 108, and inside bottom surface 110 of the impression 104. The tight friction fit formed between the molded form 114 and the impression 104 stabilizes the upper portion 100 by limiting the upper portion's 100 movement. In some embodiments, an adhesive material (for example, double-sided tape) is attached to a part of the lower portion 112 and helps couple the lower portion 112 to one or more surfaces of the impression 104. For example, an adhesive material can be attached to one or both of the sides of the lower portion 112, or to a bottom surface of the lower portion 112, or attached to one or more sides and to a bottom surface. When the lower portion 112 is inserted into the impression 104, the adhesive material couples to one or more surfaces of the impression 104, for example, to the inside bottom surface 110. To remove the cup holder, the user can exert an upward force on the cup holder, which will remove the cup holder from the impression 104. Similarly, an adhesive material (e.g., double-sided tape) can also be used with other embodiments of the invention to help attach a surface of the cup holder to a side surface or a bottom surface of the recess (e.g., finger impression) into which it placed.

In some embodiments, the cup holder engages an impression through pressure pads pushing a wall of the impression. For example, as illustrated in the example embodiment of FIG. 4, the lower portion 400 can be designed to be lowered into an impression. Once in the impression, the pressure pad 406 can be released. The pressure pad 406 will then push up against an inside surface of the impression. The force exerted by the pressure pads 406 against the impression will stabilize the upper portion 410. In some embodiments, two pressure pads are used in conjunction to stabilize the upper portion. In some embodiments, three pressure pads are used in conjunction to stabilize the upper portion. In some embodiments, four pressure pads are used in conjunction to stabilize the upper portion. To remove the cup holder, the user can exert an upward force on the cup holder, which will remove the cup holder from the impression. In some embodiments, the user can use a knob (not shown) to reduce the force exerted by the pressure pads, and then remove the cup holder from the impression.

Figure 5:
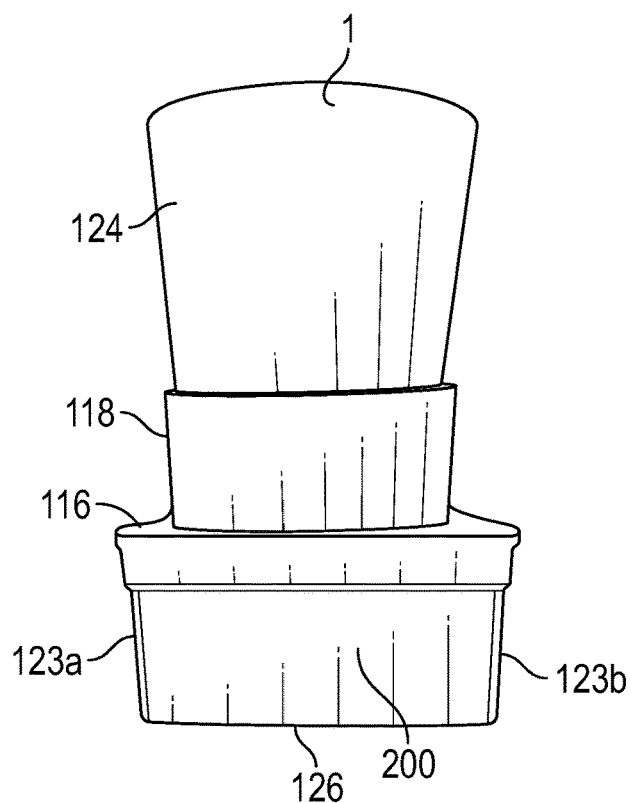
FIG. 5 illustrates an example of a side view of a cup holder that has a lower portion structured to fit into an impression on the interior of the vehicle door.

FIG. 5 illustrates an example of a side view of a cup holder 1 that has a lower portion structured to fit into an impression on the interior of the vehicle door. The side of the cup holder 1 that is shown is the side that is disposed proximate to the door when the cup holder 1 is positioned in an impression on the door. The cup holder 1 includes a front end (e.g., a first end) 123a which is positioned towards the front of the vehicle when the cup holder is in the impression, and a rear end (e.g., second end) 123b which is positioned towards the rear of the vehicle when the cup holder is in the impression.

Figure 6:
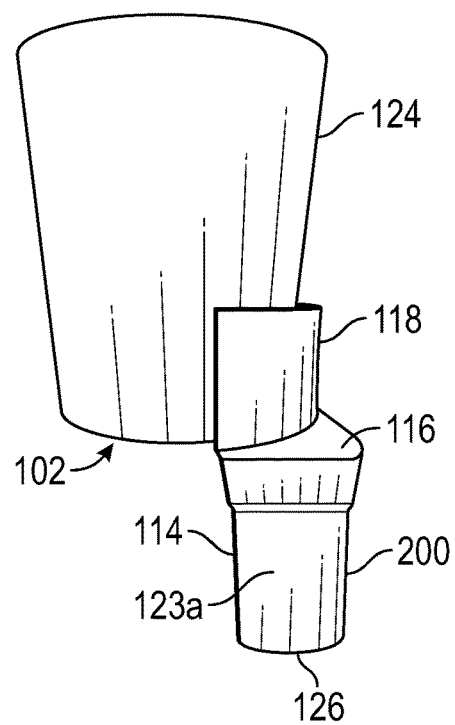
FIG. 6 illustrates an example of the front view of the cup holder illustrated in FIG. 5 (e.g., the side of the cup holder positioned towards the front of the vehicle), where the illustrated cup holder is rotated approximately 90° relative to the view shown in FIG. 5.

FIG. 6 illustrates an example of the front view of the cup holder illustrated in FIG. 5 (e.g., the side of the cup holder positioned towards the front of the vehicle), where the illustrated cup holder is rotated approximately 90° relative to the view shown in FIG. 5. This view shows the bottom surface of the upper portion 102 which may rest on a portion of the door, or the door handle, when the cup holder 1 is disposed in an impression of the door. FIG. 6 shows side surface of the lower portion 200 that is positioned proximate to the door when the cup holder is placed in the impression of the door.

Figure 7:
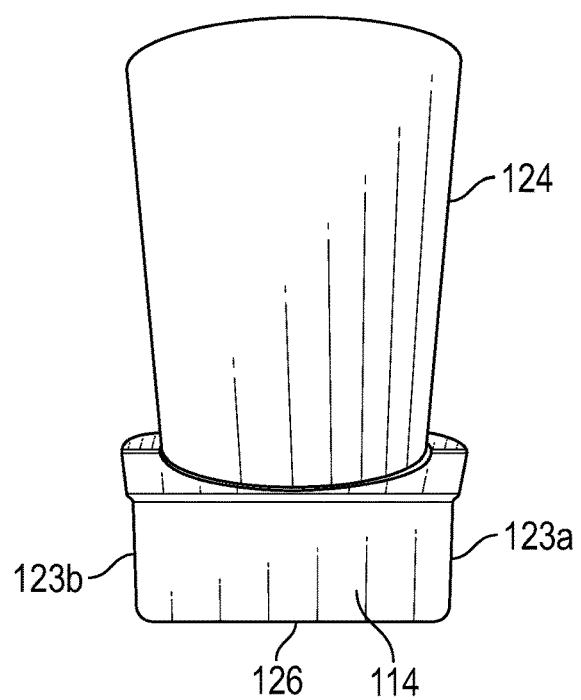
FIG. 7 illustrates an example of another side view of the cup holder illustrated in FIG. 5 (e.g., the side of the cup holder facing interior to the vehicle, that is, distal to the door), where the illustrated cup holder is rotated approximately 180° relative to the view shown in FIG. 5.

FIG. 7 illustrates an example of another side view of the cup holder illustrated in FIG. 5 (e.g., the side of the cup holder facing interior to the vehicle, that is, distal to the door), where the illustrated cup holder is rotated approximately 180° relative to the view shown in FIG. 5.

Figure 8:
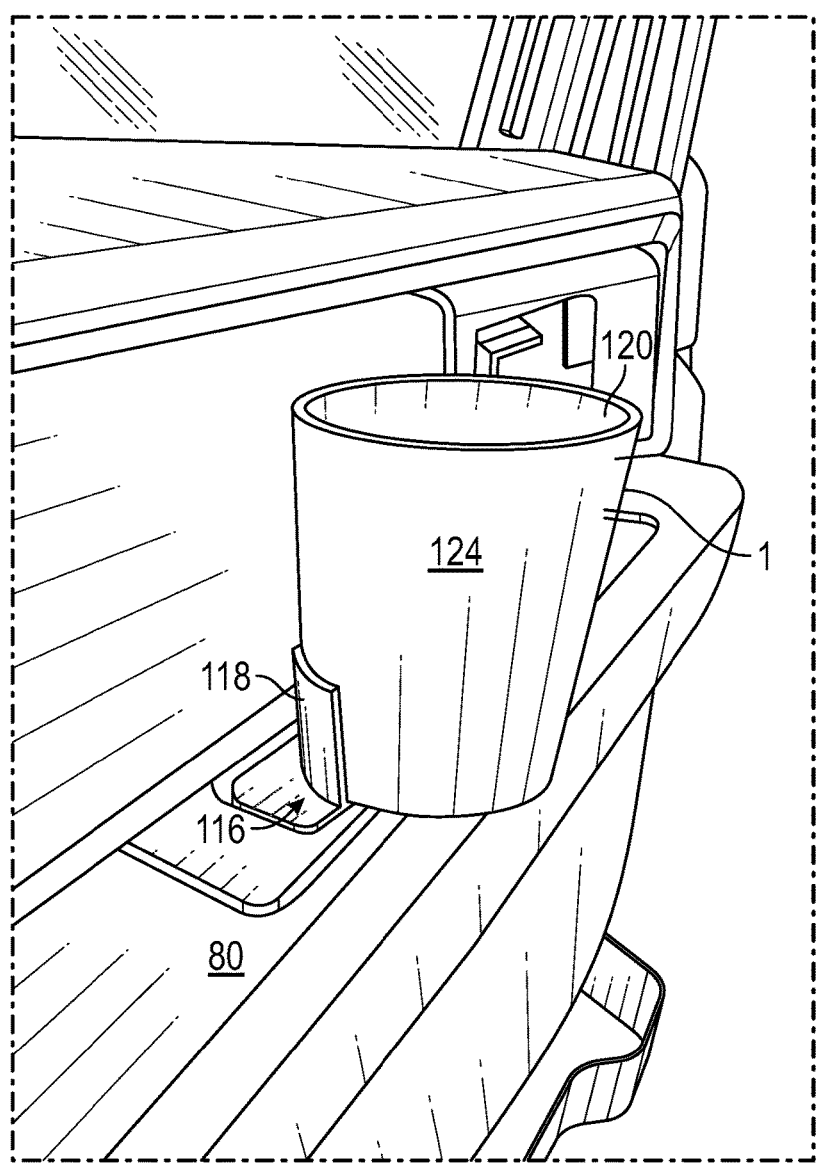
FIG. 8 illustrates an example of the cup holder illustrated in FIG. 5 where the lower portion of the cup holder has been inserted into an impression on the inside of a vehicle door (e.g., a passenger area of a vehicle). In this embodiment, the lower portion of the cup holder that is inserted into the impression is proximate to the door, and the upper portion generally extends from the lower portion upward (as oriented in the figure) such that a portion of the bottom surface of the upper portion extends over a portion of the armrest/door pull structure. In some embodiments the bottom surface of the upper portion rest on a portion of the armrest when the cup holder is inserted into the impression.

FIG. 8 illustrates an example of the cup holder 1 illustrated in FIG. 5 where the lower portion of the cup holder has been inserted into an impression on the inside of a vehicle door 80 (e.g., a passenger area of a vehicle). In this embodiment, the lower portion of the cup holder 1 that is inserted into the impression is proximate to the door, and the upper portion generally extends from the lower portion upward (as oriented in the figure) such that a portion of the bottom surface of the upper portion extends over a portion of the armrest/door pull structure. In some embodiments the bottom surface of the upper portion 102 (FIG. 6) rest on a portion of the armrest when the cup holder 1 is inserted into the impression.

Figure 9:
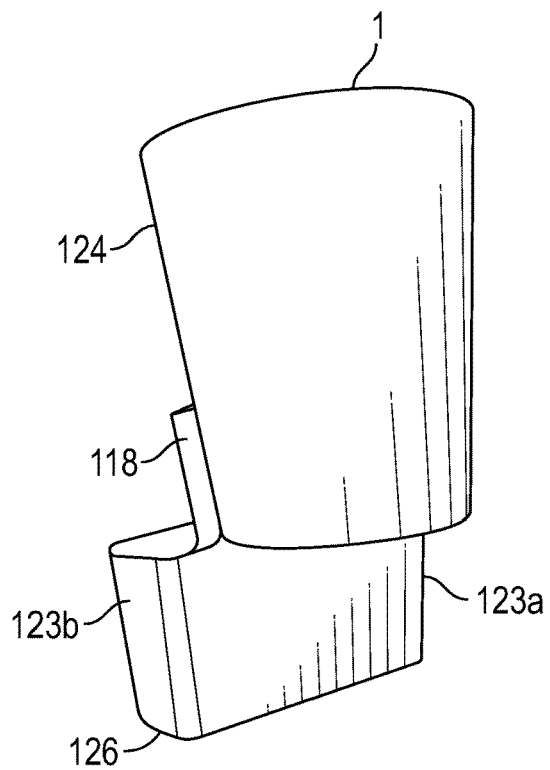
FIG. 9 illustrates a perspective view of the cup holder illustrated in FIG. 5, generally showing the side of the cup holder facing interior to the vehicle.

FIG. 9 illustrates a perspective view of the cup holder illustrated in FIG. 5, generally showing the side of the cup holder facing interior to the vehicle.

Figure 10:
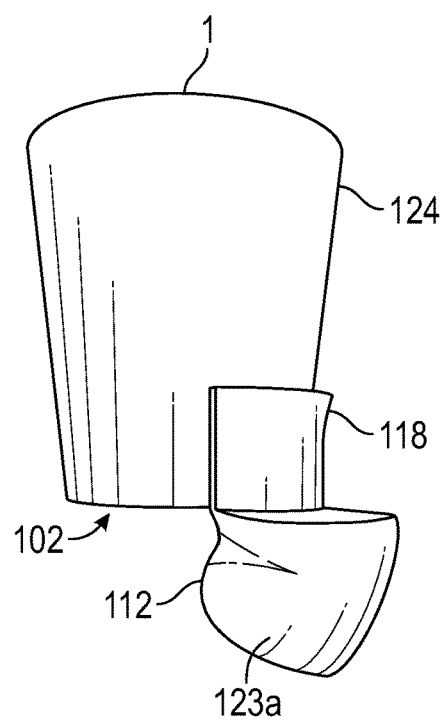
FIG. 10 illustrates a side view of another example of a cup holder (e.g., an end view of the side of the cup holder that faces the front of the vehicle when the cup holder is placed in the impression on a door, e.g., the handle of a door), having a lower portion structured to fit into an impression on the interior of the vehicle door, the lower structure in the cup holder in FIG. 10 being longer (more elongated) than the lower portion of the cup holder shown in FIG. 5. As one of skill in the art will appreciate, the lower portion in various embodiments can be structured to fit into the various shaped impression on the many vehicles that are available.

FIG. 10 illustrates a side view of another example of a cup holder (e.g., an end view of the side of the cup holder that faces the front of the vehicle when the cup holder is placed in the impression on a door, e.g., the handle of a door), having a lower portion structured to fit into an impression on the interior of the vehicle door, the lower structure in the cup holder in FIG. 10 being longer (more elongated) than the lower portion of the cup holder shown in FIG. 5. As one of skill in the art will appreciate, the lower portion in various embodiments can be structured to fit into the various shaped impression on the many vehicles that are available.

Figure 11:
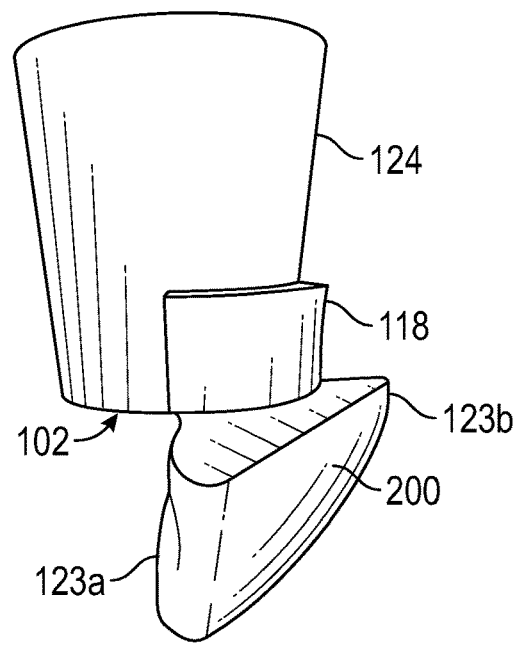
FIG. 11 illustrates a perspective view of the cup holder illustrated in FIG. 10, generally showing a side of the lower portion that is disposed towards the door when the cup holder is placed in an impression in the interior of the door.

FIG. 11 illustrates a perspective view of the cup holder illustrated in FIG. 10, generally showing a side of the lower portion that is disposed towards the door when the cup holder is placed in an impression in the interior of the door.

Figure 12:
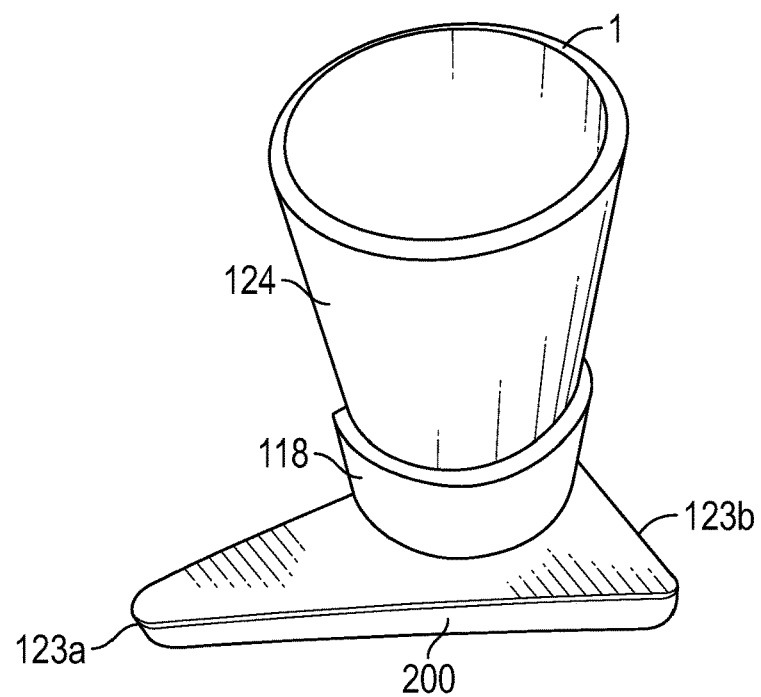
FIG. 12 illustrates another perspective view of the cup holder illustrated in FIG. 10, showing the generally triangular shape of the lower portion of the cup holder that is inserted into an impression on the door.

FIG. 12 illustrates another perspective view of the cup holder illustrated in FIG. 10, showing the generally triangular shape of the lower portion of the cup holder that is inserted into an impression on the door. The end of the lower portion 123a is disposed towards the front of the vehicle and the end of the lower portion 123b is disposed towards the rear of the vehicle when the cup holder 1 is placed in the impression on the door. The side surface of the lower portion 200 is disposed proximate to the door when the cup holder 1 is placed in the impression on the door.

Figure 13:
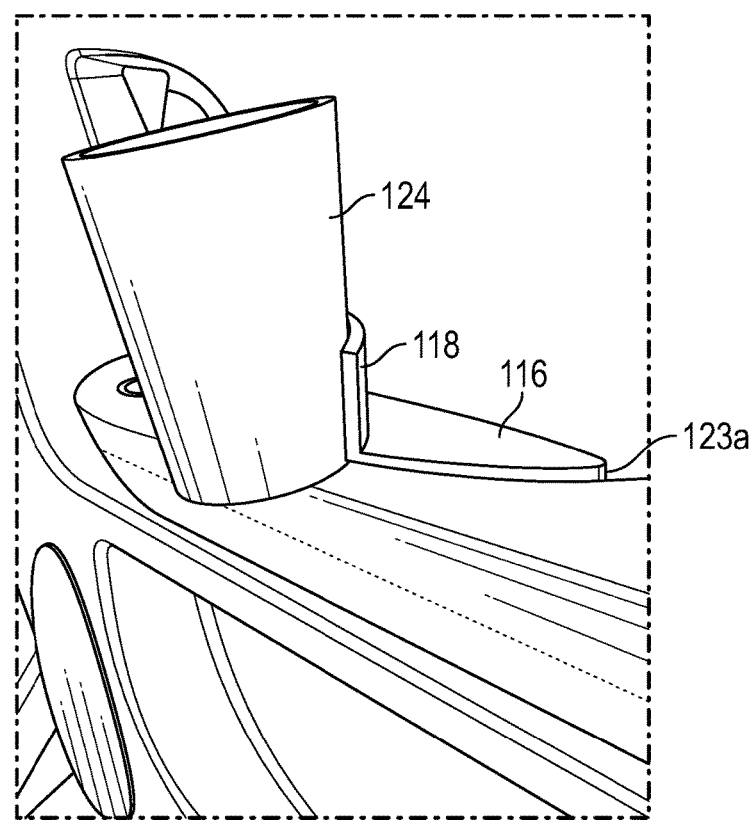
FIG. 13 illustrates an example of the cup holder illustrated in FIG. 10 where the lower portion of the cup holder has been inserted into an impression on the inside of a vehicle door (i.e., the passenger area). In this embodiment, the lower portion of the cup holder that is inserted into the impression is proximate to the door, and the upper portion generally extends from the lower portion upward (as oriented in the figure) such that a portion of the bottom surface of the upper portion extends over a portion of the armrest/door pull structure. In some embodiments the bottom surface of the upper portion rest on a portion of the armrest when the cup holder is inserted into the impression.

FIG. 13 illustrates an example of the cup holder illustrated in FIG. 10 where the lower portion of the cup holder has been inserted into an impression on the inside of a vehicle door (i.e., the passenger area). In this embodiment, the lower portion of the cup holder that is inserted into the impression is proximate to the door, and the upper portion generally extends from the lower portion upward (as oriented in the figure) such that a portion of the bottom surface of the upper portion extends over a portion of the armrest/door pull structure. In some embodiments the bottom surface of the upper portion rest on a portion of the armrest when the cup holder is inserted into the impression.

Figure 14:
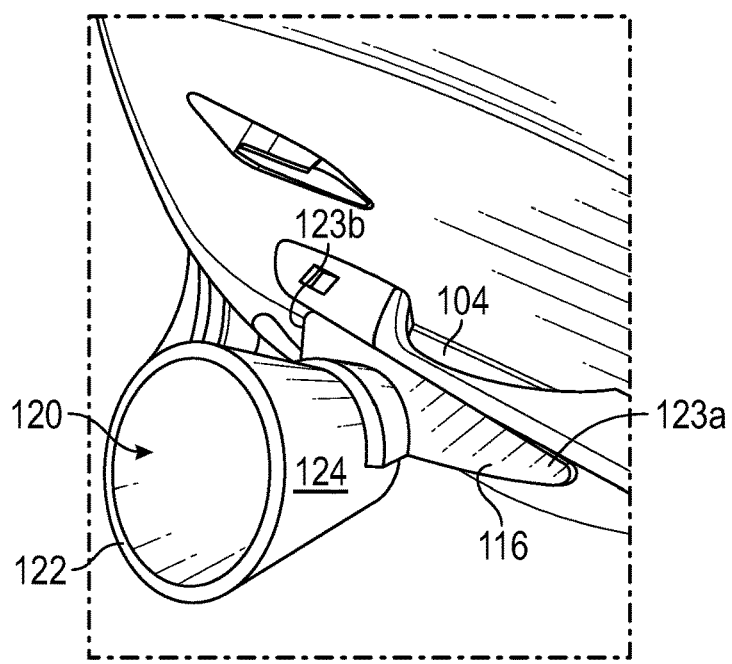
FIG. 14 illustrates an example of the cup holder illustrated in FIG. 10 prior to being inserted into an impression.

FIG. 14 illustrates an example of the cup holder illustrated in FIG. 10 prior to being inserted into an impression.

Figure 15:
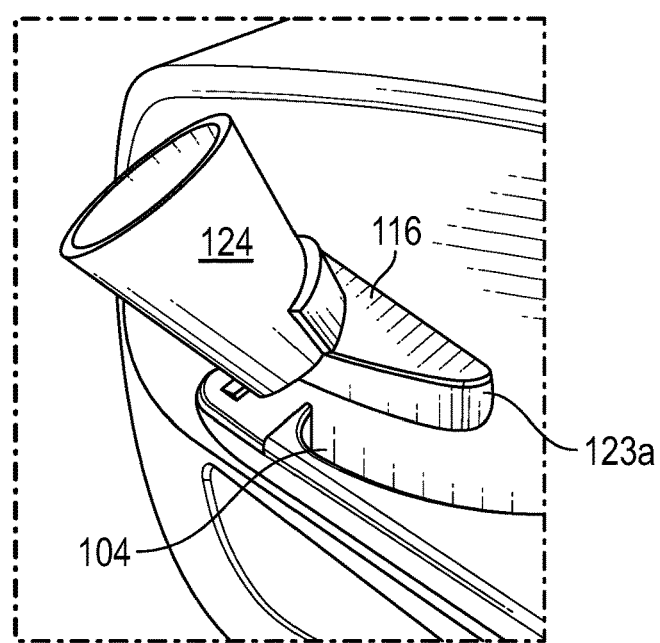
FIG. 15 illustrates another view of the cup holder illustrated in FIG. 10 prior to being inserted into an impression.

FIG. 15 illustrates another view of the cup holder illustrated in FIG. 10 prior to being inserted into an impression.

Figure 16:
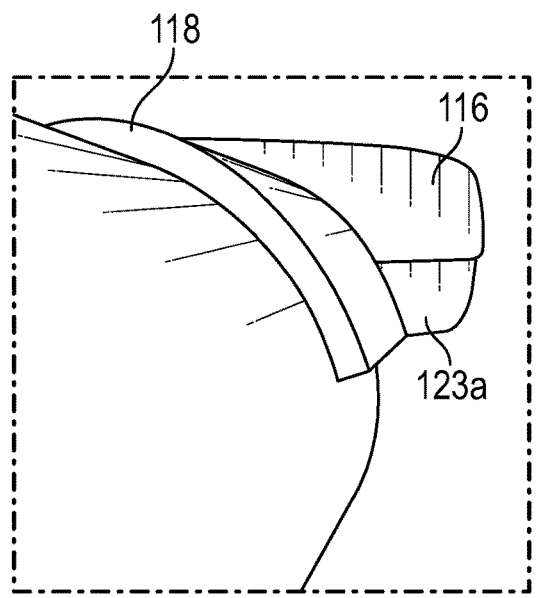
FIG. 16 illustrates another view of an example of one of the side edges of the lower portion of the cup holder device illustrated in FIG. 5

FIG. 16 illustrates another view of an example of one of the side edges of the lower portion of the cup holder device illustrated in FIG. 5

Figure 17:
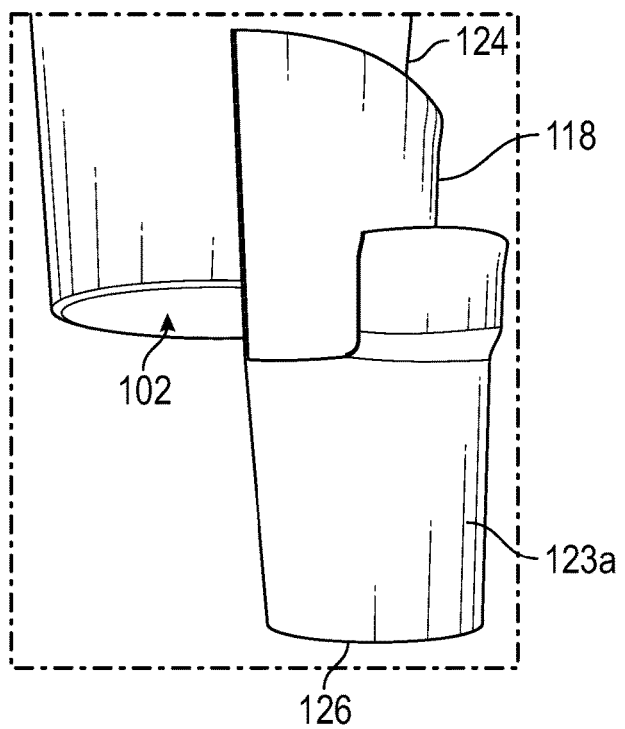
FIG. 17 illustrates another view of an example of one of the side edges of the lower portion of the cup holder device illustrated in FIG. 5, for example, the side of the end of the cup holder that faces the front of the vehicle when the cup holder is inserted in the impression of the door, where a bottom surface 102 of the upper portion may rest against (or be supported by) a portion of the door handle.

FIG. 17 illustrates another view of an example of one of the side edges of the lower portion of the cup holder device illustrated in FIG. 5, for example, the side of the end of the cup holder that faces the front of the vehicle when the cup holder is inserted in the impression of the door, where a bottom surface 102 of the upper portion may rest against (or be supported by) a portion of the door handle.

Figure 18:
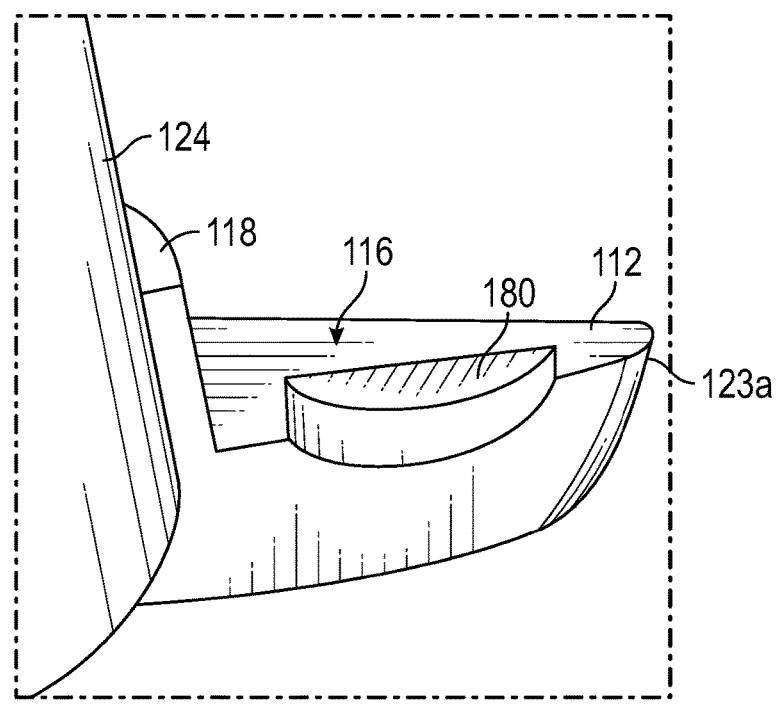
FIG. 18 illustrates an example of one of the side edges of the lower portion of the cup holder device illustrated in FIG. 10.

FIG. 18 illustrates an example of one of the side edges of the lower portion of the cup holder device illustrated in FIG. 10. FIG. 18 shows the side surface of the upper portion 124, the upper portion support wall 118, the lower portion 112, and the front and of the lower portion 123a. In various embodiments, the cup holder may also have at least one depression 180 in part of the top surface of the lower portion 116. The depression 180 is used as a finger pull for a person to close the door when the cup holder is disposed in the impression, which usually provides for this function. The depression 180 may be between about 1/16" and 1" (in depth from the top surface of the lower portion). In some embodiments, the depression 180 is between 1/2" and 3/4". In other embodiments, the depression 180 is greater than 1/2". In various embodiments, depression 180 may be of various lengths, for example, the depression 180 may be between 1/2" and 4" or more in length. In some embodiments, the lower portion 112 may include two or more depressions 180 which may be of the same dimensions or different dimensions. In some embodiments with more than one depression 180, a depression 180 may be disposed in the lower portion 112 in front of and in back of the upper portion 100 (that is, on either side of the upper portion 100).

Figure 19:
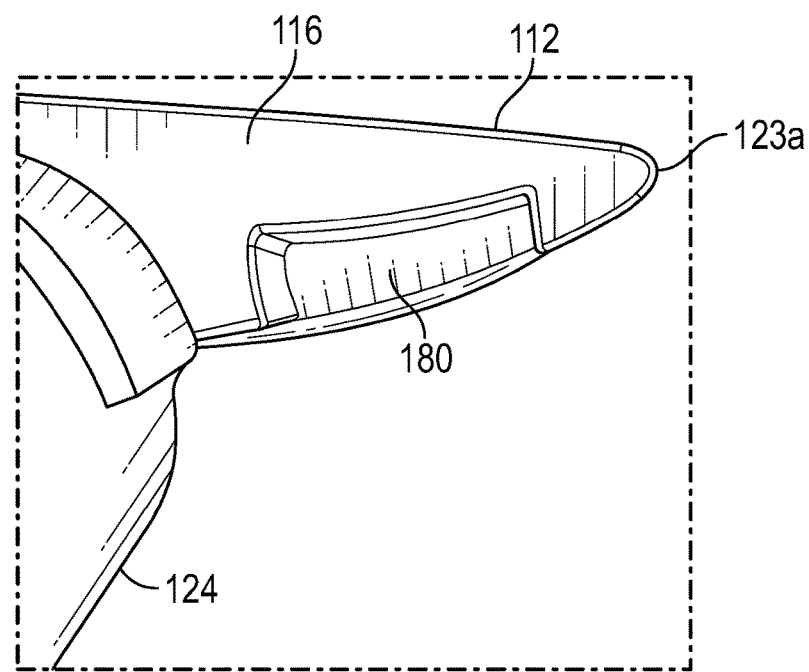
FIG. 19 illustrates another view of an example of one of the side edges of the lower portion of the cup holder device illustrated in FIG. 10.

FIG. 19 illustrates another view of an embodiment of an example of one of the side edges of the lower portion of the cup holder device illustrated in FIG. 10. This view of the example cup holder illustrates part of the lower portion 112, upper portion 124, the upper surface of the lower portion 116, the front end of the lower portion 123a, and a depression 180.

The different shapes and embodiments of lower portion may allow for the cup holder to be used in many different vehicles. These vehicles can include, but are not limited to, cars and boats. Additionally, in some embodiments, the lower portion allows for the cup holder to be used with any impression that about matches the lower portion molded form's shape. In some embodiments, the cup holder can be used with any impression that the lower portion's compression pads can be lowered into. These features allow the cup holder to be used in non-vehicles as well as vehicles.

The cup holder can comprise many different materials. For example, in some embodiments the cup holder may be formed from plastic. In some embodiments, the cup holder is formed from a thermoplastic, such as polyethylene, polyethylene terephthalate, polypropylene, polystyrene, polyvinyl chloride, or polyamide. In some embodiments, the cup holder is formed from a moldable material that will need to be cured by a user. In some embodiments, the upper portion is made from a different material than the lower portion. In some embodiments, the upper and lower portions are made from the same material. In some embodiments, the cup holder may use more than one material. In some embodiments, the cup holder may contain metal parts. For example, the cup holder can comprise a metal plate, fastener, threaded rod, and compression springs.

The cup holder can be formed using many different methods. For example, the cup holder can be formed from an injection mold, a three-dimensional printer, or assembled by hand. In some embodiments, the upper portion and lower portion are formed separately and then later connected by a support wall. For example, as illustrated in the example embodiment of FIG. 1, an inside surface of the support wall 118 attaches to the upper portion 100 while also attaching to the top surface of the lower portion 116.

What is claimed is:

1. A cup holder device for use in a vehicle door, the cup holder device comprising:
   an upper portion having a bottom surface, a peripheral rim offset from the bottom surface, and a side surface connecting the peripheral rim to the bottom surface, wherein the peripheral rim defines an opening that is configured to receive a cup in the upper portion; and
   a lower portion coupled to the upper portion, the lower portion comprising a top surface having a depression for use as a finger pull to close the vehicle door, the depression extending away from the top surface of the lower portion and having a depth between 1/16" and 1" from the top surface of the lower portion, the lower portion configured to fit into an impression of an interior portion of the vehicle door.

2. The cup holder of claim 1, wherein the upper portion has a cylindrical shape.

3. The cup holder of claim 1, wherein the side surface of the upper portion is sloped.

4. The cup holder of claim 1, wherein the bottom surface of the upper portion is about flat.

5. The cup holder of claim 1, wherein the bottom surface of the upper portion is solid.

6. The cup holder of claim 1, wherein the bottom surface of the upper portion is lined with padding.

7. The cup holder of claim 1, wherein the peripheral rim of the upper portion has a circular shape.

8. The cup holder of claim 1, wherein the impression of an interior vehicle door is a pull cup.

9. The cup holder of claim 1, wherein the lower portion fits inside the impression of both a left-sided and right-sided vehicle door.

10. The cup holder of claim 1, wherein the bottom surface of the upper portion is configured to rest against a portion of a door handle when the cup holder device when fully inserted into the impression of a vehicle door.

11. The cup holder of claim 1, wherein the lower portion has a rectangular shape with rounded edges.

12. The cup holder of claim 1, wherein the upper and lower portions are formed from the same material.

13. The cup holder of claim 1, wherein the upper portion includes a support wall.

14. The cup holder of claim 13, wherein an interior surface of the support wall attaches to the upper portion and a bottom surface of the support wall attaches to the lower portion.

15. The cup holder of claim 13, wherein the support wall is formed from the same material as the upper and lower portions of the device.

\* \* \* \* \*